Figure 1:
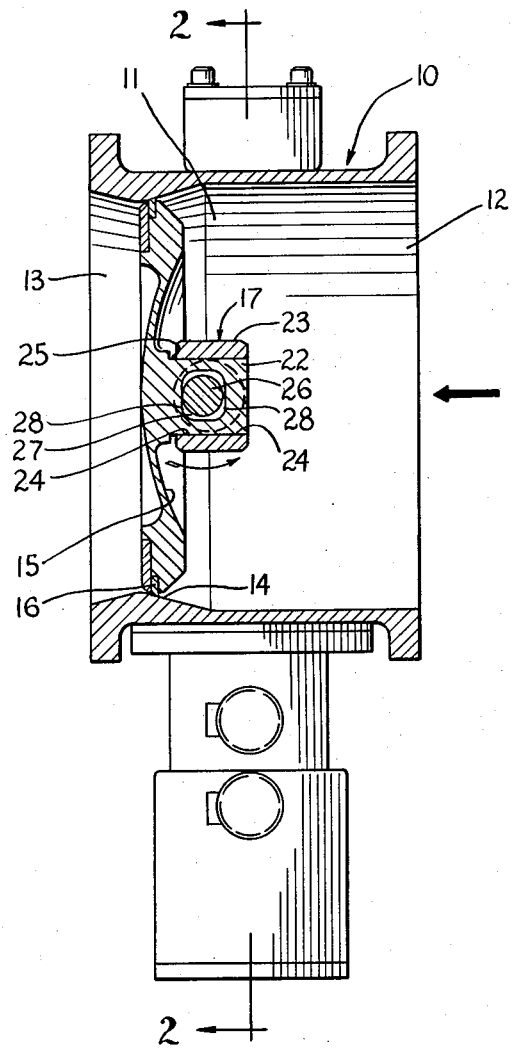

July 21, 1964  R. F. WHITE  3,141,648
VALVE
Filed June 11, 1962  3 Sheets-Sheet 1

INVENTOR.
ROGER F. WHITE
BY
AGENT

INVENTOR.
ROGER F. WHITE

July 21, 1964  R. F. WHITE  3,141,648
VALVE

Filed June 11, 1962  3 Sheets-Sheet 3

INVENTOR.
ROGER F. WHITE
BY
AGENT

United States Patent Office 3,141,648
Patented July 21, 1964

3,141,648
VALVE
Roger F. White, Rutherford, N.J., assignor to Thiokol Chemical Corporation, Bristol, Pa., a corporation of Delaware
Filed June 11, 1962, Ser. No. 201,683
9 Claims. (Cl. 251—163)

This invention relates in general to valves and has particular reference to the hybrid butterfly-poppet type of valve capable of general application for controlling the flow of working fluids in large capacity conduits but which is especially devised for cryogenic fluid service.

For the intended use, a combination butterfly-poppet valve embodies the low pressure drop and small space envelope normally associated with a butterfly valve and the cryogenic seal effectivity of a poppet type closure. However, the two-stage sequential movements of a valve of butterfly-poppet type require bulky actuation mechanism which usually must be located exteriorly with respect to the valve body. In accordance with usual practice, the valve body is made of metal and the housing for the valve actuation mechanism is cast as an integral part of the valve body. This structural arrangement is desirable in many ways but poses a critical problem when the intended working fluid is to be cryogenic, i.e. a refrigerant such as the liquid oxygen, liquid hydrogen and liquid fluorine employed as propellants in rocket propulsion. Any water or moisture which enters the actuator housing will become frozen and thereby jam the actuator mechanism due to the heat transfer between the housing and the cryogenic working fluid in the valve body.

In the prior art, to the best of my knowledge and belief, there is no actuator means for a butterfly-poppet valve which is of such construction that it would not become jammed and thereby rendered inoperative when the working fluid is cryogenic.

In view of the above-enumerated disadvantages of the prior art butterfly-poppet valves and the actuating mechanisms therefore, it is the primary object of my present invention to provide an improved valve and actuation mechanism therefor which will not be undesirably affected in any way by use in connection with cryogenic working fluid.

To be more explicit, I have devised valve actuation mechanism of extremely simple, rugged construction which is divided into those moving parts which will not be affected by direct exposure to cryogenic fluid and those parts which cannot withstand such exposure. The parts which will not be affected are completely immersed in the cryogenic working fluid being handled by the valve and the other parts are sealed off by suitable means for their protection. As an important result, in that part of the actuator housing which contains parts not vulnerable to cryogenic fluid, complete immersion of parts in cryogenic fluid serves to exclude any mositure which otherwise would become frozen and thereby jam operation of the actuation mechanism.

Another object of the invention is to provide a valve seat of novel geometrical shape and a sealing ring of cooperative shape on the movable valve disk to provide self alignment whereby increasing system pressures serve to increase the sealing force when the valve is closed.

Figure 2:
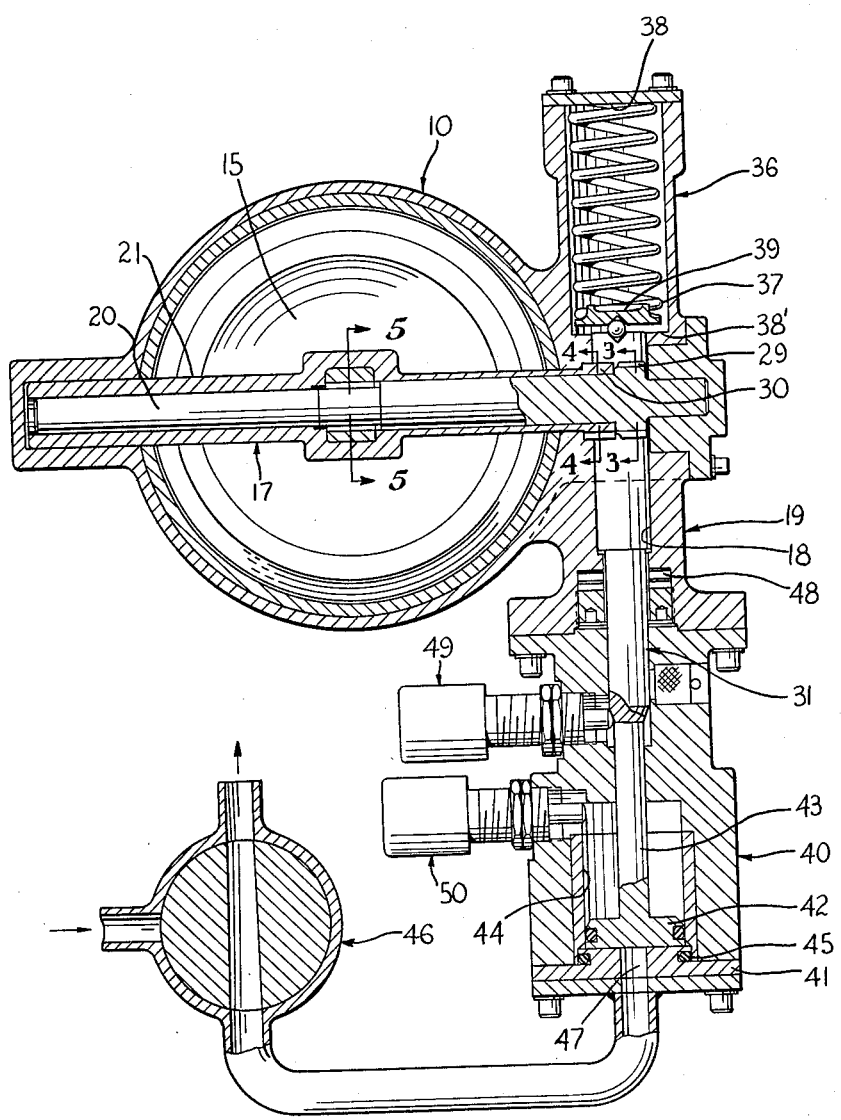
Figures 3, 4:
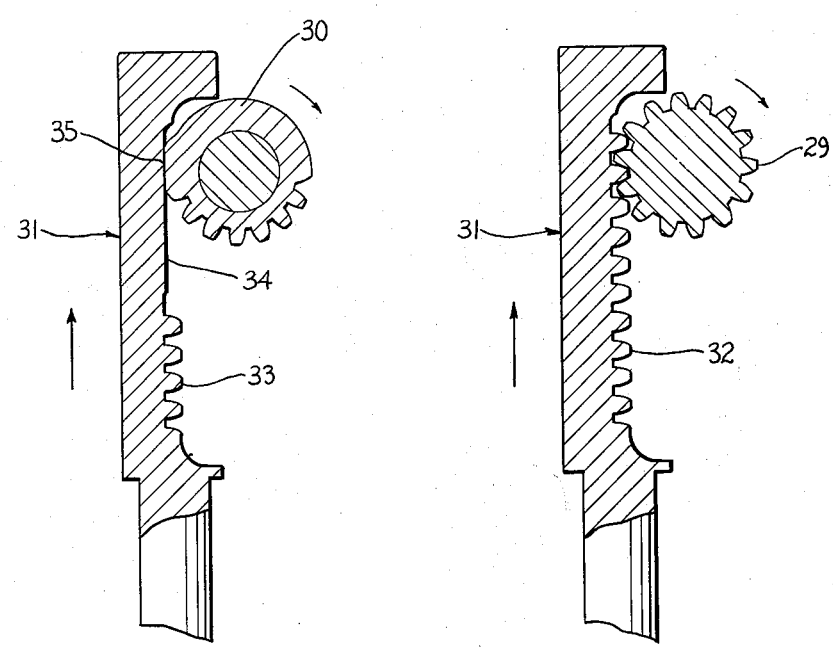
Figure 5:
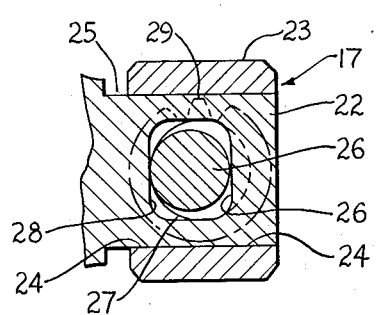

Still further objects, advantages and features will become apparent as the following specific description is read in connection with the accompanying drawings, in which:

FIGURE 1 is a vertical axial sectional view of the valve body and movable valve disk, showing the latter in completely closed condition;

FIGURE 2 is a transverse vertical section on line 2—2 of FIGURE 1;
FIGURE 3 is a detail fragmentary section on line 3—3 of FIGURE 2;
FIGURE 4 is a similar view on line 4—4 of FIGURE 2; and
FIGURE 5 is a section view taken on the line 5—5 of FIGURE 2.

Referring now in detail to the drawings, wherein like reference characters designate corresponding parts in the several views, I have shown a butterfly-poppet valve including a valve body 10 having a through flow passage 11 of large-capacity cross-sectional area extending from upstream inlet 12 to downstream outlet 13.

Inwardly adjacent to outlet 13, an upstreamwardly facing annular seat 14 is provided for circular butterfly-poppet movable valve disk 15. Valve seat 14 is a spherical segment generated to exacting tolerances and surface finish. The fluorocarbon ring seal 16, which is mounted with screws on the downstreamward face of movable valve disk 15 for closing contact with valve seat 14, is constructed in accordance with proven principles of the liquid oxygen poppet seals on disconnect valves employed on missiles. This is done because my improved valve is intended for use in controlling the flow of cryogenic working fluids. The geometry of the seal and seat configurations provides self-alignment and increasing system pressures serve to increase the sealing force. Thus, seal effectivity is enhanced, as in the case of conventional poppet type valves, as system pressure is increased.

A valve-operating shaft 17 extends diametrically through flow passage 11 and has its ends journaled in the lateral wall of valve body 10 with one end protruding exteriorly with respect to said valve body into but transverse of the guide bore 18 of an actuator housing 19 formed rigid and preferably integral with valve body 10.

Valve-operating shaft 17 comprises respective inner and outer coaxial sections 20 and 21, of which inner shaft section 20 protrudes further exteriorly with respect to valve body 10 than outer shaft section 21.

Means in provided to import sequential butterfly-poppet action to movable valve disk 15 under the influence of shaft actuation means to be described in detail later herein. Briefly described, the poppet action is intermittently divided into two stages of rectilinear motion which occur at spaced time intervals. Commencing with movable valve disk 15 in the seated closed position shown in FIGURES 1 and 2, the first stage consists in moving said valve disk axially away from its seat 14 (to the right in FIGURE 1). The second stage, which occurs after valve disk 15 has been rocked through an arch of 90 degrees into open position feathered in the fluid stream (not shown) and thereafter rocked reversely into a position wherein its axis again is in alignment with valve seat 14, consists in moving valve member 15 axially back onto the said seat.

The butterfly action also is divided into two stages, i.e. the 90 degrees rocking motion from axial alignment of movable valve disk 15 with seat 14 but spaced relation to the latter into fully open position, which is the first stage, and reverse rocking motion back into axial alignment with its seat, which is the second stage.

Means directly connected to movable valve disk 15 is provided to transmit motion from valve operating shaft 17 to said valve disk and thereby effect rectilinear motion in opposite directions axially with respect to valve seat 14. This motion transmission means will now be described.

Movable valve disk 15 is provided with a central lug 22 which projects axially inward, or upstreamward. Lug 22 is rectangular in cross-section and arranged with its major cross-sectional axis in a diametrical plane in relation to the axis of valve disk 15. Outer section 21 of valve-operating shaft 17 has an enlarged portion 23 located in axial alignment with the center of movable valve disk 15 and this enlarged portion is provided with diametrically registering through apertures 24—24 in its side walls. Apertures 24—24 correspond in rectangular shape and dimensions to lug 22 of movable valve disk 15 to permit reciprocating axial sliding engagement of the said lug with the said apertures. Lug 22 has an upstreamwardly facing shoulder 25 for limiting contact with enlarged portion 23 of outer shaft section 21 when movable valve disk 15 reaches the upstreamward end of its first stage of poppet action to eliminate oscillation, or flutter, of the said valve disk in the open position.

Inner section 20 of valve-operating shaft 17 is reduced in diameter in the region of the enlarged portion 23 of outer shaft section 21 in a manner to provide an eccentric cam portion 26 of circular cross-section. Lug 22 on movable valve disk 15 has a diametrically elongated cam-follower cross bore 27 in which the cam portion 26 of the inner shaft section 20 fits with minimum clearances in contact with the long more narrowly spaced faces 28—28 of the said cross bore.

Actuation means for valve operating shaft 17 which is sheltered within housing 19, includes two pinion gears 29 and 30 which are provided fixedly (either integrally or by attachment) on the ends of the respective shaft sections 20 and 21 which protrude exteriorly from valve body 10. Pinion gear 29 is completely toothed but pinion gear 30 is segmental. A unitary toothed rack bar 31 is mounted in guide bore 18 for longitudinal reciprocation in a linear path tangential to valve-operating shaft 17 and is divided along its center line into respective first and second rack sections 32 and 33. First rack section 32 has a long row of teeth in continual mesh with the pinion gear 29 on inner shaft section 20, and this row of teeth is of sufficient length to rotate said inner shaft section through an arc of 180 degrees in either direction to cause reciprocation of movable valve disk 15 in axial rectilinear movement throughout its two poppet action stages.

Second rack section 33 is of split tooth configuration, i.e. it has a short row of teeth which extends throughout one-half the length of the row of teeth of first rack section 32 and is arranged to be alternately in and out of mesh with pinion gear 30 on outer shaft section 21 to rotate the latter through an arc of 90 degrees in either direction and thereby rock movable valve disk 15 in its successive butterfly action stages. In other words, the outer end of the short row of teeth of the second rack section 33 lies opposite to one end of the long row of teeth of the first rack section 32 and the inner end of said short row of teeth terminates midway with respect to said long row.

From the inner end of the short row of teeth of second rack section 33 to the corresponding end of the long row of teeth of first rack section 32, said second rack section has a flat toothless longitudinal bearing face 34 lying in the plane of the roots of the teeth of said short row and extending from the inner end of the latter to the corresponding end of the long row of teeth of said first rack section. For co-operation with the bearing face 34 of second rack section 33, pinion gear 30 on outer shaft section 21 has a flat peripheral chordal bearing face 35 merging with the teeth of said pinion gear and arranged for sliding contact with said flat bearing face 34 throughout a dwell period when the teeth of the second rack section 33 are out of mesh with pinion gear 30 on outer-shaft section 21 to prevent rotation of said outer shaft section relative to inner shaft section 20 during the dwell period, which is when valve operating shaft 17 as a whole is being rotated by the first rack section 32. This is to cause both shaft sections 20 and 21 to rotate together and insure continuous rocking motion of movable valve disk 15 throughout both stages of its butterfly action.

At the appropriate end of actuator housing 19, a spring cylinder 36 is provided in axial communication with guide bore 18 thereof. A compression spring 37 is interposed between the outer removable head 38 of spring cylinder 36 and a movable piston-like head 39 provided on the corresponding end of rack bar 31. In its normally expanded condition, spring 37 presses head 39 downward against the inner head 38' of spring cylinder 36, in which position the shaft actuating means and valve operating means will have closed movable valve disk 15 on its seat 14. Spring-loading means is thus provided to close the valve automatically.

Means by which the valve may be opened at will is provided at the end of actuator housing 19 opposite to spring cylinder 36. While electrical or other means may be utilized for this purpose within the spirit and scope of the invention, it is presently preferred to employ pneumatic means, as shown. Accordingly, a pneumatic cylinder 40 is removably mounted at the above-mentioned opposite end of actuator housing 19 in communication with the corresponding end of guide bore 18 and in axial alignment therewith. Cylinder 40 has a removable head 41 and a piston 42 is mounted for reciprocation in cylinder 40 and has a piston rod, or stem, 43 in contact with the corresponding end of rack bar 31. Hoop stresses are absorbed by the aluminum sleeve 44 which encloses piston 42, the pneumatic pressure being isolated from phenolic actuator housing 19 by the O-ring seals 45 in head 41 and the phenolic piston 42. A two-way selector valve 46 in one position connects a source of pressurized fluid (not shown) to the outer end of pneumatic cylinder 40 through a port 47 in head 41 of said cylinder and in its alternative position vents said cylinder to the atmosphere.

Fluorocarbon lip seals, which have been developed to a high degree of perfection and reliability are provided at 48 to isolate the pneumatic passages of the actuation means from the cryogenic working fluid. Thermal isolation is further provided by the cylinder body 40 and piston 42, both of which are fabricated of a high strength laminate phenolic, to preclude short-circuit thermal effects.

Although I do not claim invention for this feature, standard position indication switches 49 and 50 are shown mounted on pneumatic cylinder body 40 to monitor full open and closed positions of movable valve disk 15 as a function of linear position of piston 42 and rack bar 31. The position indicators thus are exposed to surrounding ambients and not to pneumatic pressure nor to the cryogenic working fluid. It is, however, an important part of my invention to provide that all other moving parts in sliding or rubbing contact, including shaft 17, all bushings, closure spring 37, rack bar 31, and pinion gears 29 and 30, operate completely immersed in the cryogenic working fluid. This feature of my invention is intended to exclude moisture from the region of the actuator housing 19 which contains sliding and rubbing parts. Otherwise, any moisture present would freeze and interfere with free operation.

The operation of the valve will now be described.

Assuming movable valve disk 15 to be in closed position on valve seat 14 with pneumatic cylinder 40 vented to the atmosphere by valve 46 and spring 37 in expanded condition, as shown in FIGURE 1, opening of the said valve disk may be accomplished by adjusting two-way selector valve 46 into the position in which the said pneumatic cylinder is open to the source of pressurized fluid. When this is done, piston 42 will be driven inward (upward in FIGURE 2) and rack bar 31 will in turn be thrust upward to overcome the valve-closing action of spring 37. Throughout the complete upward excursion of rack bar 31, first rack section 32 will rotate pinion gear 29 and consequently inner shaft section 20 through an arc of 180 degrees. As a result, cam 26 on inner shaft section 20, during the first 90 degrees of rotation, will pull movable valve disk 15 off its seat 14 through the first stage of poppet action into a position in which the said valve disk is sufficiently clear of the said seat to be free from rocking movement in the first stage of butterfly action. During the first half of the complete upward excursion of rack bar 31, the flat bearing face 35 of pinion gear 30 on outer shaft section 21 will be in sliding contact with flat bearing face 34 of said rack bar to prevent rotation of said outer shaft section and premature rocking of movable valve disk 15 during the first stage of poppet action. At this midpoint in the translation of rack bar 31, the toothed segment of pinion gear 30 will enter into mesh with the short row of teeth of second rack section 33 and thereafter until the end of the upward stroke will lock inner shaft section 20 to outer shaft section 21 for coincidental rotation with the result that movable valve disk 15 will be rocked through its first stage of butterfly action through an arc of 90 degrees into a horizontal position feathered in the stream of working fluid.

Whenever it is desired to close movable valve disk 15 again, selector valve 46 is adjusted into its alternative position in which pneumatic cylinder 40 is vented to the atmosphere, whereupon the tension of spring 37 is released to drive rack bar 31 downward. During the first half of this downward excursion, second rack section 33 will rotate segmental pinion gear 30 together with outer shaft section 21 through an arc of 90 degrees in locked coincidence with fully toothed pinion gear 29, which is driven by first rack section 32. Movable valve disk 15 will thereby be rocked in reverse direction through the second stage of butterfly action into axial alignment with seat 14. In the lower half of the downward excursion of rack bar 31, flat bearing face 34 of second rack section 33 will slide upward along flat section 35 of pinion gear 30 to prevent any rotation of outer shaft section 21 which otherwise would disturb the axial alignment of movable valve disk 15 with seat 14 during the second stage of poppet action in which first rack section 32 rotates pinion gear 29 and inner shaft section 20 to thrust said valve disk firmly into seated position.

While there have been shown and described and pointed out the fundamental novel features of this invention as applied to a single structural embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

I claim:

1. In a butterfly-poppet valve, the combination of a valve body having a through flow passage for working fluid with upstream inlet and downstream outlet, an upstreamwardly facing annular valve seat located in the valve body inwardly adjacent to the outlet, a circular butterfly-poppet movable valve disk adapted in closed position to fit the valve seat, a valve-operating shaft extending diametrically through the flow passage of the valve body upstreamwardly with respect to the valve seat with its end journaled in the lateral wall of said valve body and including co-axial inner and outer shaft sections of which corresponding ends protrude exteriorly from the valve body with the inner shaft section protruding further than the outer shaft section, a first motion transmission means connecting the movable valve disk to the inner shaft section in a manner to cause rectilinear movement of said valve disk axially toward and away from the valve seat in a poppet two-stage action when said inner shaft section is rocked in opposite directions through a predetermined arc of angular movement, a second motion transmission means connecting the movable valve disk to the outer shaft section in a manner to cause rotational motion of said valve disk about the axis of the valve operating shaft in a butterfly two-stage action between partially open position and fully open position feathered in the working fluid stream and the reverse when said outer shaft section is rocked in opposite directions through a predetermined arc of angular movement, co-ordinated actuation means for the respective sections of the valve-operating shaft located exteriorly with respect to the valve body, said valve actuation means being constructed and arranged to impart sequential rocking movement to said respective shaft sections in a manner to rock the inner section in one direction followed by rocking of the outer section in the same direction and then to rock said outer section in the reverse direction followed by rocking of said inner section in the reverse direction, the shaft actuation means including pinion gears provided fixedly on the exteriorly protruding ends of the respective inner and outer sections of the valve operating shaft, a unitary toothed actuator rack bar mounted exteriorly with respect to the valve body for longitudinal reciprocation in a rectilinear path tangential to the valve operating shaft and divided along its center line into respective first and second rack sections, of which rack sections said first rack section has a long row of teeth in continual mesh with the pinion gear on the inner shaft section and is of sufficient length to rotate said inner shaft section through an arc of 180 degrees in either direction to cause rectilinear axial movement of the movable valve disk in its poppet action stages, and of which rack sections said second rack section has a short row of teeth extending throughout one-half the length of said first rack section and arranged to be alternately in and out of mesh with the pinion gear on the outer shaft section to rotate the latter through an arc of 90 degrees in either direction and thereby rock the movable valve disk in its successive butterfly action stages, said second rack section having a flat toothless longitudinal bearing face lying in the plane of the roots of the teeth of said short row and extending from the inner end of the latter to the corresponding end of the long row of teeth of said first rack section, and the pinion gear on the outer shaft section having a flat peripheral chordal bearing face merging with the teeth of said pinion gear and arranged for sliding contact with the flat bearing face of said second rack section throughout a dwell period when the teeth of the latter rack sections are out of mesh with the pinion gear on the outer shaft section to prevent rotation of said outer shaft section with respect to said inner shaft section.

2. The invention defined in claim 1, to which is added means to reciprocate the shaft actuation rack bar in opposite directions.

3. The invention defined in claim 2, wherein the rack reciprocation means includes spring-loading means which exerts longitudinal thrust on that end of the actuation rack bar which will force the movable valve disk into closed position on its seat.

4. The invention defined in claim 3, wherein the rack reciprocation means also includes means by which spring overbalancing thrust may be exerted on the opposite end of the rack bar to open the valve.

5. The invention defined in claim 4, wherein the shaft actuation means includes an actuator housing located externally with respect to the valve body in rigid relation thereto and having a guide bore in which the rack bar is slidably mounted, said housing including a spring cylinder at one end in alignment and communication with the said guide bore and having an outer head, a head on the actuator rack mounted for reciprocation in said spring cylinder, and a normally expanded coil spring positioned in the spring cylinder in interposed relation to said heads to bias the rack bar into valve closing position.

6. The invention defined in claim 5, wherein the spring overbalancing and valve opening means includes a pneumatic cylinder located at the end of the housing opposite to the spring cylinder in alignment and communication with the guide bore of said housing a piston mounted for reciprocation in said pneumatic cylinder and including a piston rod in alignment and engagement with the rack bar, and valve means to alternately admit fluid under pressure to the outer end of said pneumatic cylinder to overbalance the spring-loading means and open the valve and to vent said pneumatic cylinder to permit the spring-loading means to close the valve.

7. The invention defined in claim 6, wherein the guide bore of the housing and the spring cylinder are in communication with the valve body in a manner to immerse the pinion gears, rack bar and spring in the working fluid, and wherein sealing means is provided to prevent access of working fluid to the pneumatic cylinder.

8. The invention defined in claim 7, wherein the pneumatic cylinder is made of heat insulating material.

9. In a butterfly-poppet valve, the combination of a valve body having a through flow passage for working fluid with upstream inlet and downstream outlet, an upstreamwardly facing annular valve seat located in the valve body inwardly adjacent to the outlet, a circular butterfly-poppet movable valve disk adapted in closed position to fit the valve seat, a valve-operating shaft extending diametrically through the flow passage of the valve body upstreamwardly with respect to the valve seat with its ends journaled in the lateral wall of said valve body and including co-axial inner and outer shaft sections of which corresponding ends protrude exteriorly from the valve body with the inner shaft section protruding further than the outer shaft section, a first motion transmission means connecting the movable valve disk to the inner shaft section in a manner to cause rectilinear movement of said valve disk axially toward and away from the valve seat in a poppet two-stage action when said inner shaft section is rocked in opposite directions through a predetermined arc of angular movement, a second motion transmission means connecting the movable valve disk to the outer shaft section in a manner to cause rotational motion of said valve disk about the axis of the valve operating shaft in a butterfly two-stage action between partially open position and fully open position feathered in the working fluid stream and the reverse when said outer shaft section is rocked in opposite directions through a predetermined arc of angular movement, the said outer shaft section of the valve-operating shaft having an enlarged portion in axial alignment with the center of the movable valve disk which is provided with diametrically registering through apertures in its side wall, a central lug projecting axially upstreamward from the movable valve disk and axially slidably engaged within said through apertures, the inner shaft section being reduced in diameter in the region of the enlarged portion of the outer shaft section in a manner to provide an eccentric cam portion, the lug on the movable valve disk having a diametrically elongated cam-follower cross bore in which the cam portion of the inner shaft section fits with minimum clearances in contact with the long faces of said cross bore, and the lug on the movable valve disk having a limiting stop shoulder facing upstreamward in opposed relation to the enlarged portion of the outer shaft section and being constructed and arranged to be spaced radially from said enlarged portion of the outer shaft section when said valve disk is in closed contact with its seat in one rotational position of the inner shaft section and its cam portion and to be pressed tightly against said enlarged portion of the outer shaft section in the diametrically opposite rotational position of said inner shaft section and its cam portion, whereby the outer shaft section is immobilized with respect to the movable valve disk in the butterfly stage action and flutter is prevented.

References Cited in the file of this patent

UNITED STATES PATENTS

| | | |
|---|---|---|
| 2,128,542 | Snow | Aug. 30, 1938 |
| 2,586,927 | Fantz | Feb. 26, 1952 |
| 2,910,266 | Condello et al. | Oct. 27, 1959 |
| 2,919,885 | Daigle | Jan. 5, 1960 |
| 2,989,990 | Bass et al. | June 27, 1961 |
| 3,035,793 | Ralph et al. | May 22, 1962 |
| 3,065,950 | Goldberg | Nov. 27, 1962 |

FOREIGN PATENTS

| | | |
|---|---|---|
| 1,184,986 | France | Feb. 9, 1959 |
| 614,844 | Canada | Feb. 21, 1961 |